US006978812B2

(12) United States Patent  (10) Patent No.: US 6,978,812 B2
Summerville  (45) Date of Patent: Dec. 27, 2005

(54) MOBILE BAG FILLING SYSTEM

(76) Inventor: Joe Summerville, P.O. Box 191202, San Diego, CA (US) 92159-1202

( * ) Notice: Subject to any disclaimer, the term of this patent is extended or adjusted under 35 U.S.C. 154(b) by 0 days.

(21) Appl. No.: 10/921,668

(22) Filed: Aug. 19, 2004

(65) Prior Publication Data

US 2005/0076971 A1    Apr. 14, 2005

Related U.S. Application Data

(60) Provisional application No. 60/496,412, filed on Aug. 19, 2003.

(51) Int. Cl.$^7$ ............................................. B65B 1/04
(52) U.S. Cl. ...................... 141/316; 141/114; 141/231; 141/313; 141/314
(58) Field of Search ...................... 141/114, 166, 231, 141/256, 313–316, 392; 414/523; 198/300, 198/312

(56) References Cited

U.S. PATENT DOCUMENTS

| | | | | |
|---|---|---|---|---|
| 1,495,886 A | * | 5/1924 | Craite | 141/231 |
| 1,593,189 A | | 7/1926 | Mauch | |
| 3,199,550 A | | 8/1965 | Crowe | 141/76 |
| 3,382,644 A | | 5/1968 | Vogt | 53/29 |
| 3,552,346 A | * | 1/1971 | Garden | 141/72 |
| 4,044,921 A | | 8/1977 | Caverly | 222/74 |
| 4,184,522 A | | 1/1980 | Waite | 141/231 |
| 4,425,069 A | * | 1/1984 | Saur et al. | 414/398 |
| 4,558,556 A | | 12/1985 | Jostler | 53/459 |
| 4,585,041 A | | 4/1986 | Cavanagh | 141/231 |
| 4,945,713 A | | 8/1990 | Widenback | 53/459 |
| D320,800 S | | 10/1991 | Johnson et al. | D15/10 |
| 5,215,127 A | | 6/1993 | Bergeron | 141/10 |
| 5,806,576 A | | 9/1998 | Sutherlin | 141/314 |
| 5,873,396 A | | 2/1999 | Biebrach et al. | 141/231 |
| 5,893,260 A | | 4/1999 | McKenna | 53/451 |
| 5,988,237 A | | 11/1999 | Bedsole | 141/231 |
| 6,047,863 A | | 4/2000 | Kanzler et al. | 222/238 |
| 6,112,956 A | | 9/2000 | Malone | 222/642 |

(Continued)

FOREIGN PATENT DOCUMENTS

| | | | | |
|---|---|---|---|---|
| WO | WO 01/36271 A2 | 5/2001 | | B65B 1/00 |
| WO | 03/000553 A1 | 1/2003 | | B65B 31/00 |

*Primary Examiner*—Timothy L. Maust
(74) *Attorney, Agent, or Firm*—Starkweather & Associates; Michael W. Starkweather; Jason P. Webb

(57) ABSTRACT

A mobile bag filling system for filling bags with fluent matter, such as sand, and comprises a hopper, a flume, and first and second conveyor systems. The hopper receives the fluent matter from a source and an auger within the hopper moves the fluent matter onto the first conveyor system and transfers the fluent matter from the hopper up a ramping section to the flume. The flume directs the fluent matter into at least one holding receptacle, or sandbag. The second conveyor system receives the sandbag after it has received the fluent matter and moves the sandbag sufficiently to one side of the flumes to allow a user to fill another sandbag. The mobile bag filling system may also include a sandbag docking station configured to receive the sandbag after the sandbag has received the fluent matter and disconnected from the flume. The sandbag docking station and the second conveyor system are positioned such that when the sandbag is pushed toward the second conveyor system, the sandbag falls onto the second conveyor system. A string clamp automatically seals the sandbags.

20 Claims, 9 Drawing Sheets

U.S. PATENT DOCUMENTS

| | | | |
|---|---|---|---|
| 6,237,309 B1 | 5/2001 | DeMarco | 53/502 |
| 6,269,849 B1 | 8/2001 | Fields, Jr. | 141/166 |
| 6,390,154 B1 | 5/2002 | Hall | 141/314 |
| 6,484,654 B2 | 11/2002 | Chiu | 111/200 |

* cited by examiner

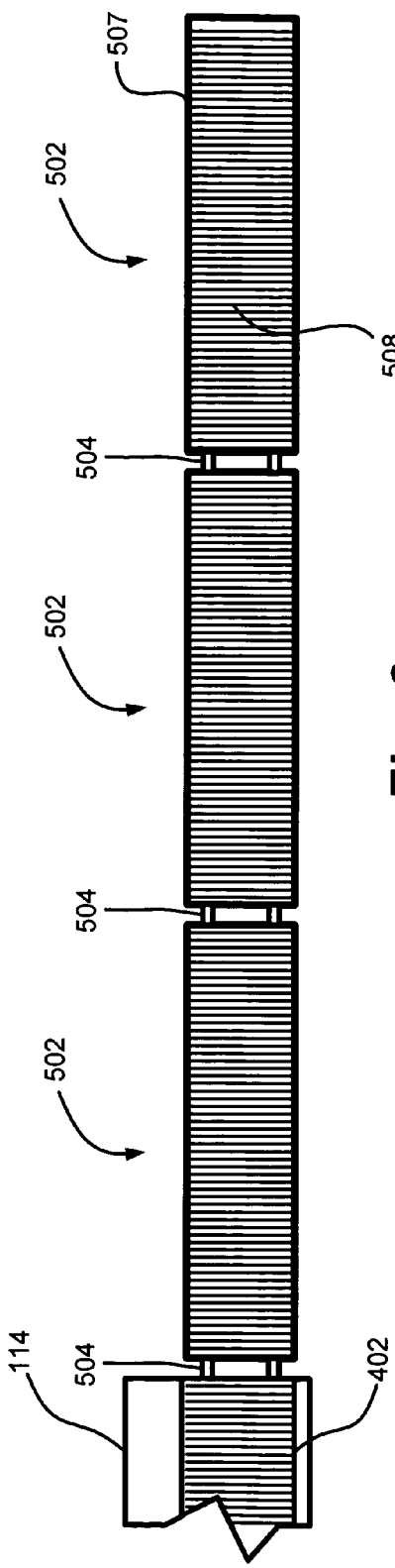
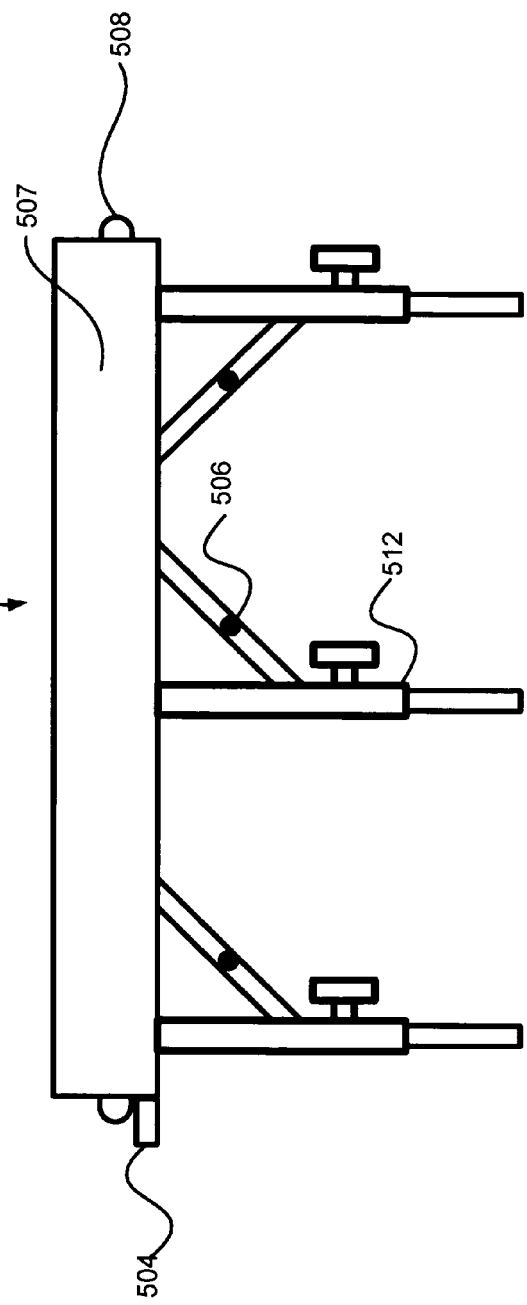

MOBILE BAG FILLING SYSTEM

RELATED APPLICATIONS

This application claims priority to U.S. Provisional Patent Application Ser. No. 60/496,412, for inventor Joe Summerville, filed on Aug. 19, 2003, entitled "RESCUE SANDBAG MACHINE."

FIELD OF THE INVENTION

The present invention relates to mobile bag filling systems. Specifically, the present invention relates to an improved mobile machine for providing sandbag filling matter to sandbags.

DESCRIPTION OF THE RELATED ART

Deformable receptacles, like burlap bags, containing fluent matter, such as sand, have been found to be effective in the formation of permanent or temporary barricades to prevent, for example, the passage of liquid therethrough. In particular, bags filled with sand or other substantially fluent material are used extensively to obstruct the flow of water and thereby protect property from potential water damage during a flood. Sandbags may also be used for a number of other applications, including for barricades at construction sites, for riot control, and for military fortifications.

Filling such receptacles manually, however, is slow and difficult work, and is generally accomplished by one person holding a receptacle in an open position while a second person repeatedly shovels or otherwise carries fluent matter from a bulk source through the opening of the receptacle until the receptacle is appropriately filled. Relatively efficient two-person teams generally require about twenty to thirty seconds using such manual techniques to fill a single bag with approximately thirty pounds of fluent matter. Sandbags, however, are often demanded in large quantities and in emergency situations where time is of the essence. Thus, it is desirable to expedite the preparation and delivery of sandbags in such situations.

The problem facing sandbag providers is the prompt and efficient delivery of sandbags to the application site. Obviously, a bulk source of fluent matter must be present at the site where the sandbags are to be filled. Thus, the sandbags must either be filled at a location remote from where the sandbags are to be applied or a bulk source of fluent matter must be transported to the application site. There are numerous advantages of the latter method with respect to the former. First, it is generally not known prior to arriving at the application site how many sandbags will be required. Thus, if one is required to remotely fill the sandbags, then it is likely that either too many or too few sandbags will be prepared. Obviously, if too many sandbags are prepared, one risks that the additional time required to prepare the extra sandbags will permit an emergency situation to worsen. Alternatively, if too few sandbags are prepared, one risks not being able to adequately address the emergency situation.

Another disadvantage of preparing sandbags at a location remote from the application site is that, once prepared, the sandbags must be transported to the application site. It generally requires considerable manpower to load and unload vehicles for transporting sandbags from a remote location to an application site. Thus, in order to reduce required manpower, it is desirable to fill the required sandbags very proximately to, or preferably at, the application site.

The difficulty with on-site filling is that it is usually manually performed and very arduous. Furthermore, despite highly advanced sandbagging machines, once the sandbags are loaded, they must be manually removed from the sandbag machine and carried to the area intended for application. This process is also time consuming, labor intensive, and requires a large group of people to transport the sandbags.

Therefore, it can be seen that there is a need for a mobile bag filling system that provides for increased bag filling capacities and increases the speed at which the bags can be delivered to the area oaf application.

SUMMARY OF THE INVENTION

The present invention has been developed in response to the present state of the art, and in particular, in response to the problems and needs in the art that have not yet been fully solved by currently available mobile bag filling systems. Accordingly, the present invention has been developed to provide an improved mobile bag filling system that overcomes many or all of the above-discussed shortcomings in the art.

Specifically, according to one embodiment of the present invention, the mobile bag filling system is configured to fill bags with fluent matter, such as sand, and comprises a hopper, a flume, and first and second conveyor systems. The hopper is configured to receive the fluent matter from a source, such as a front loader, and an auger within the hopper moves the fluent matter. The first conveyor system is positioned to receive the fluent matter from the auger, and transfer the fluent matter from the hopper to the flume. The flume directs the fluent matter into at least one holding receptacle, or sandbag. The second conveyor system receives the sandbag after it has received the fluent matter and moves the sandbag sufficiently to one side of the flumes to allow a user to fill another sandbag.

In another embodiment, the mobile bag filling system comprises a sandbag docking station configured to receive the sandbag after the sandbag has received the fluent matter and disconnected from the flume. The sandbag docking station and the second conveyor system are positioned such that when the sandbag is pushed toward the second conveyor system, the sandbag falls onto the second conveyor system.

In a further embodiment a portable conveyor transports the sandbag from the second conveyor system away from the mobile bag filling system. Brackets hold the portable conveyor on the mobile bag filling system.

In yet another embodiment, the mobile bag filling system includes a plurality of telescoping, rotating light systems coupled to the first conveyor system and a plurality of storage areas.

In another embodiment string clamps, such as flanges, coupled to the flume, hold draw strings on the sandbags so that when the sandbag drops from the flume, the string clamps draw the sandbag closed to seal the fluent matter within.

In yet another embodiment, the mobile bag filling system comprises a hopper, at least one flume, and first and second conveyor systems. The filling system is positioned at a lower rear portion of the mobile bag filling system. The flume is positioned at an upper portion of the mobile bag filling system. The first conveyor system moves the fluent matter up a ramping section, from a lower section of the mobile bag filling system, to a higher section of the mobile bag filling system. The second conveyor system receives the sandbag after it has received the fluent matter and moves the sandbag sufficiently to one side of the at least one flume to allow a user to fill another sandbag.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention, as well as other features and advantages not listed, will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6 illustrates a top view of portable conveyors according to one embodiment of the present invention;

FIG. 7 illustrates a side view of a portable conveyor according to one embodiment of the present invention;

DETAILED DESCRIPTION OF THE INVENTION

Figure 1:
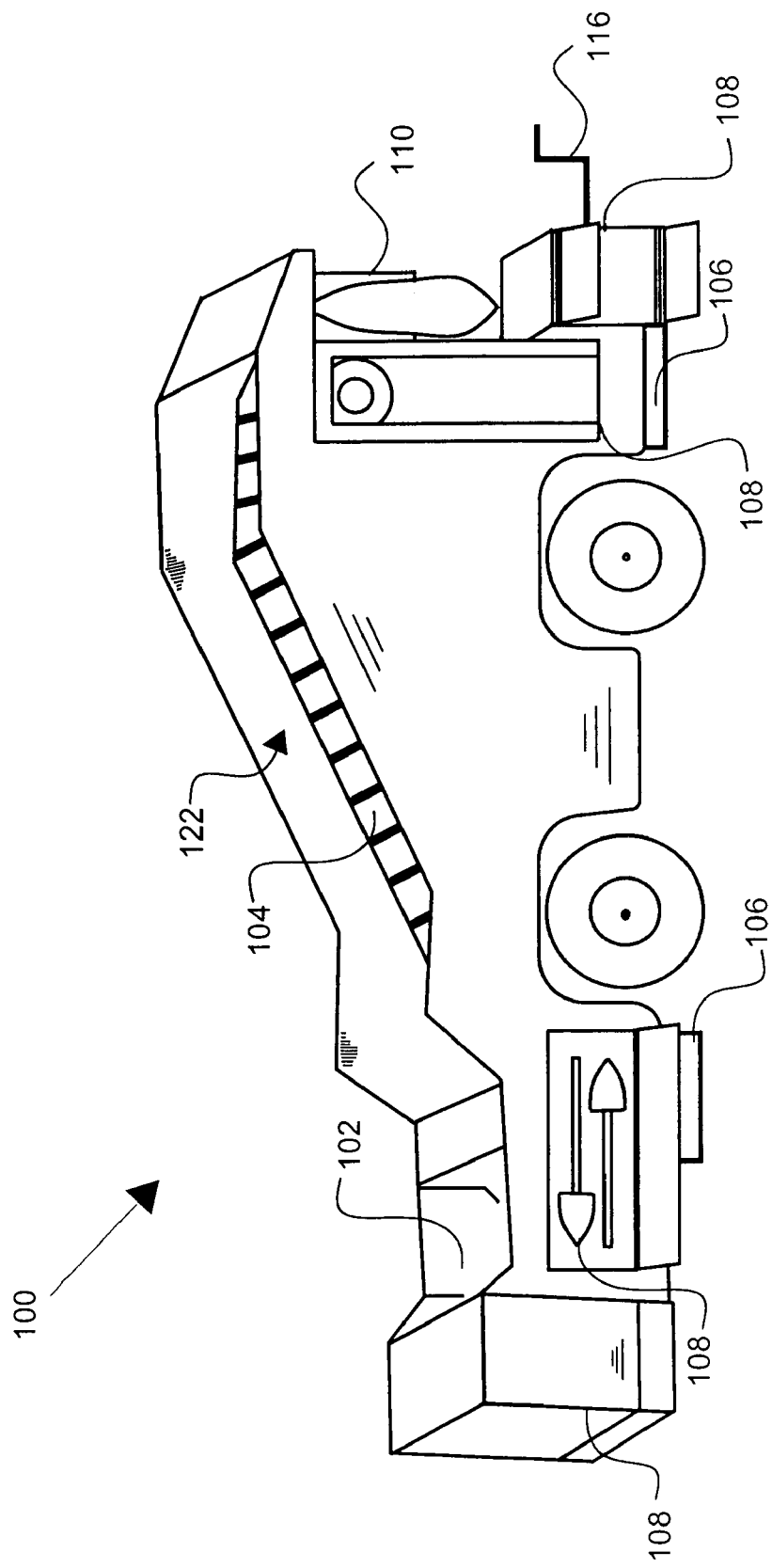
FIG. 1 illustrates a side perspective view of a mobile bag filling system according to one embodiment of the present invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 2:
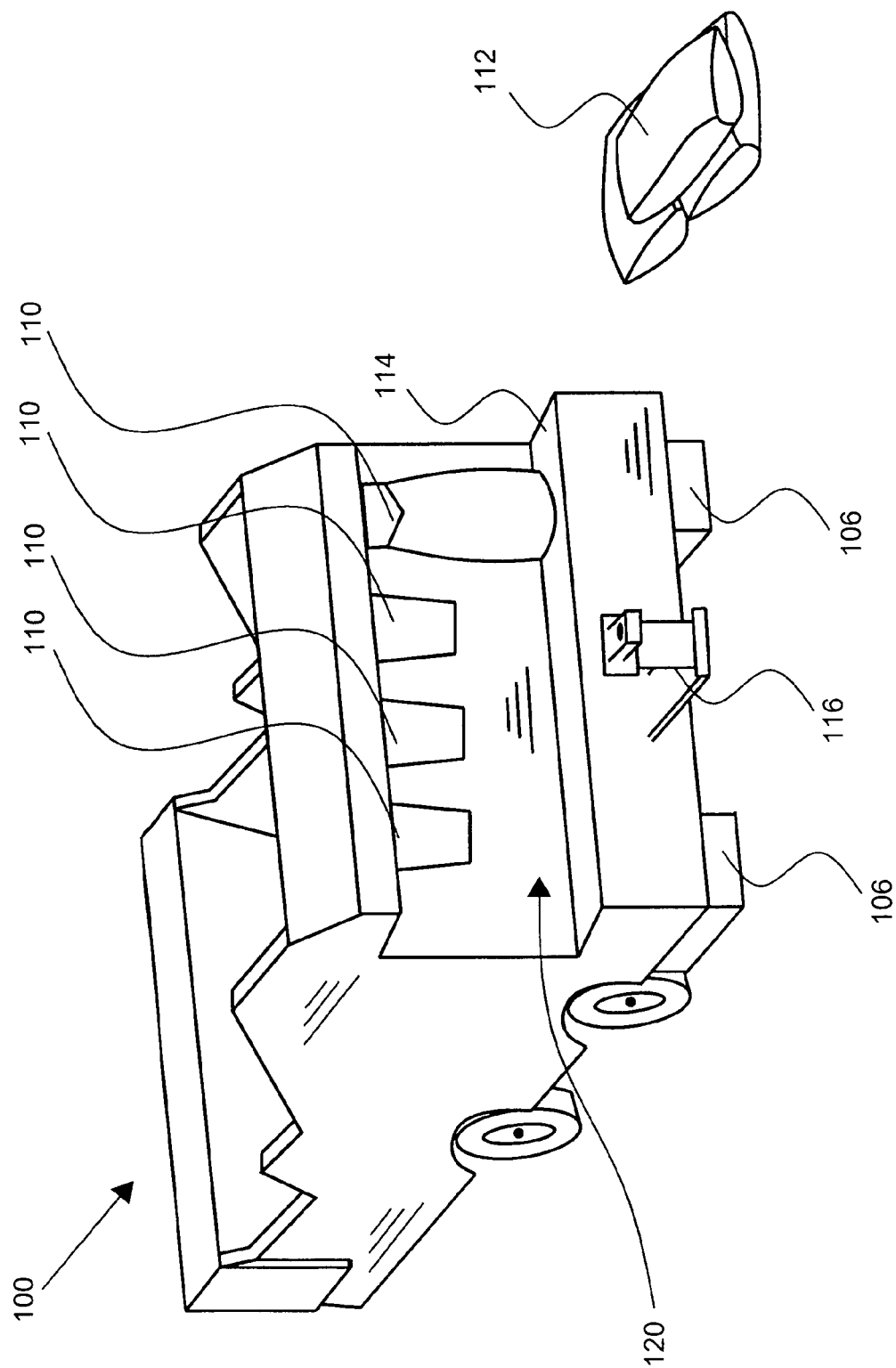
FIG. 2 illustrates a front perspective view of a mobile bag filling system according to one embodiment of the present invention.

FIGS. 1 and 2 illustrate a side perspective view and front perspective view of a mobile bag filling system 100 according to one embodiment of the present invention. The mobile bag filling system 100 is configured to fill holding receptacles, such as sandbags 112 with fluent matter 305 (See FIG. 5), such as sand. In one embodiment, the mobile bagging system 10 comprises a hopper, 102, a flume or directing member 110, and first and second conveyor systems 104 and 114 respectively. The hopper 102 is configured to receive the fluent matter from a source and an auger 702 (See FIG. 9) within the hopper 102 moves the fluent matter. The first, or fluent matter conveyor system 104 is positioned to receive the fluent matter from the auger, and transfers the fluent matter from the hopper 102 to the flume 110. The flume 110 directs the fluent matter into at least one sandbag 112. The second, or bagged matter conveyor system 114 receives the sandbag 112 after it has received the fluent matter and moves the sandbag 112 sufficiently to one side of the flumes 110 to allow a user to fill another sandbag 112.

The second conveyor system 114 is positioned between a back side 118 of a filling area 120 to allow a user to fill the sandbag 112 and push the filled sandbag 112 onto the second conveyor system 114. Advantageously, the position of the second conveyor system 114 eliminates the need of the user to lift the heavy filled sandbag 112 risking injury and slowing the filling process. Rather, once the filled sandbag 112 is pushed onto the second conveyor system 114, the second conveyor system transports the sandbag 112 away from the filling area 120.

In one embodiment, the mobile bag filling system 100 is designed as a trailer with a hitch 116 to be towed behind a vehicle to a specified location. After arriving at the specified location, stabilizer support jacks 106 extend from the mobile bag filling system 100 at predetermined locations to stabilize and level the mobile bag filling system 100. The stabilizer support jacks 106 may be cranked down manually, or preferably, automatic, self-leveling, hydraulic systems may be used. Additionally, storage spaces 108 may be used to store shovels, stabilizer landings, empty sandbags 112, etc.

Figure 3:
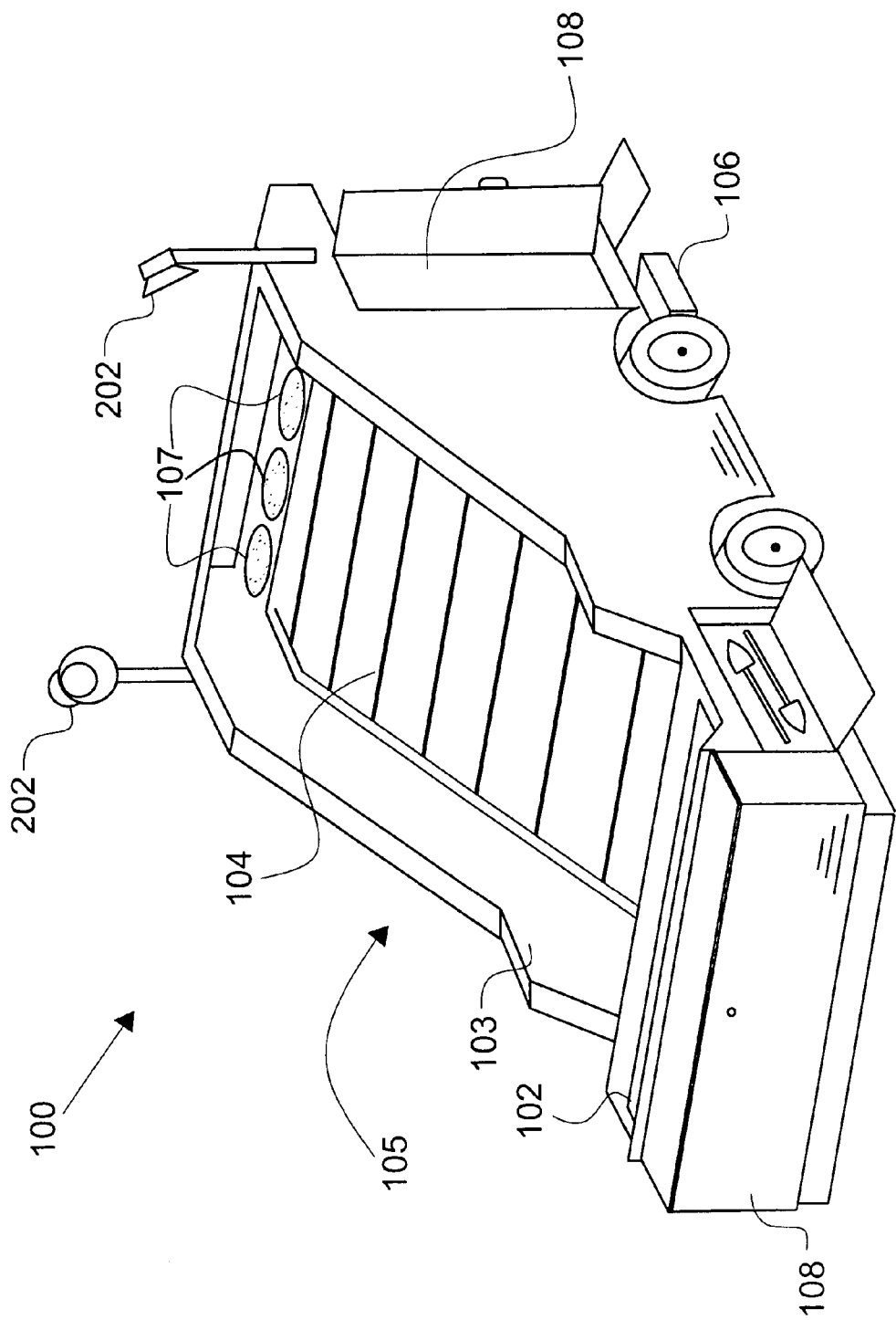
FIG. 3 illustrates a rear perspective view of a mobile bag filling system according to one embodiment of the present invention.

FIG. 3 illustrates a rear perspective view of a mobile bag filling system according to one embodiment of the present invention. The hopper 102 is positioned advantageously low to allow a tractor loader, for example, to deposit the fluent matter. The hopper 102 may also be filled by any other means, such as manually or by dump truck. The auger 105 (See FIG. 9) breaks down the fluent matter in order to move the fluent matter onto the first conveyor system 104.

The first conveyor system 104 moves the fluent matter up a ramping section 122 from the hopper 102 to the flumes 110. The first conveyor system 104 is configured with ridges, rails, or grooves, to increase and control the amount of dirt that can be carried up the ramping section 122. Optionally, the first conveyor system 104 may comprise a multiplicity of holes to allow water and saturated dirt to pass through the first conveyor system before being placed in the sandbags 112. Advantageously, this reduces the amount of mud in the sandbags 112 and improves the quality of the sandbag 112.

The first conveyor system 104 is designed to be substantially the same width as the hopper 102. Consequently, the first conveyor system pulls the fluent matter from the entire hopper 102 rather than from a centrally located opening, which decreases the amount of compact typical to prior sandbag machines. Additionally, walls 103 slope inwardly towards the first conveyor system 104 to maintain the fluent matter thereon.

Figure 4:
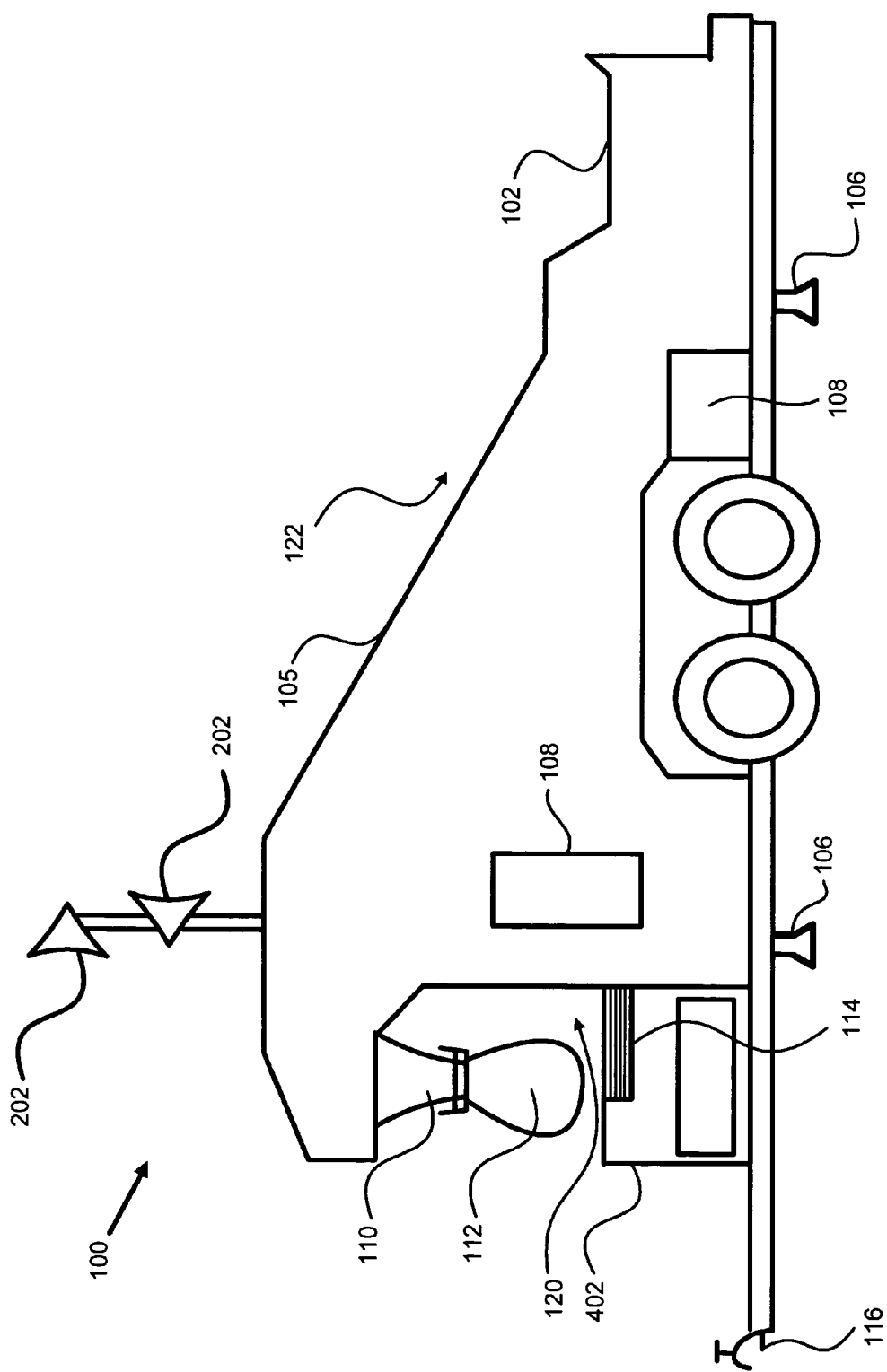
FIG. 4 illustrates a side view of a mobile bag filling system and second conveyor system for moving loaded sandbags away from the bag hopper according to one embodiment of the present invention.

FIG. 4 illustrates a side view of a mobile bag filling system 100 and second conveyor system 114 for moving filled sandbags 112 away from the filling area 120 according to one embodiment of the present invention. The flume 110 is configured for optimal sand capacity, and to fill each sandbag 112 equally. Optionally, the flume 110 may also comprise a shut-off valve (not shown). The mobile bag filling system 100 preferably uses standard sandbags, but may also be adapted to fill any style of sandbag 112.

A sandbag docking station 402 is positioned between the user (not shown) and the second conveyor system 114. The sandbag docking station 402 receives the sandbags 112 after they have been filled. The sandbags 112 are ultimately pushed onto the second conveyor system 114 and moved away from the filling area 120. The sandbag docking station 402 is configured to be at an optimal height for the user to hold and fill a standard sandbag. The flumes 110 are placed at a height above the sandbag docking station 402 to allow the user enough room to easily place, fill, and remove the sandbag 112. In one embodiment, the mobile bag filling system 100 may also comprise telescoping and pivotable lights 202. The lights 202 are configured to rotate and bend to fit within storage compartments 108.

In operation, users detach the mobile bag filling system 100 from the truck or tractor that is hauling it, and then fill the hopper 102. A gas motor, electric generator, or the like (not shown) may power the mobile bag filling system 100. The fluent matter travels up the ramping section 122 of the first conveyor system 104 and fills each flume 110 equally. The sandbags 112 are filled in the filling area 120 and transported away from the mobile bag filling system 100 via the second conveyor system 104 to begin the next round of filling. This configuration allows users to work at different paces because when the sandbag 112 is filled, the sandbag is pushed to the second conveyor system 114 and is transported behind the other sandbags 112 that are being filled.

Figure 5:
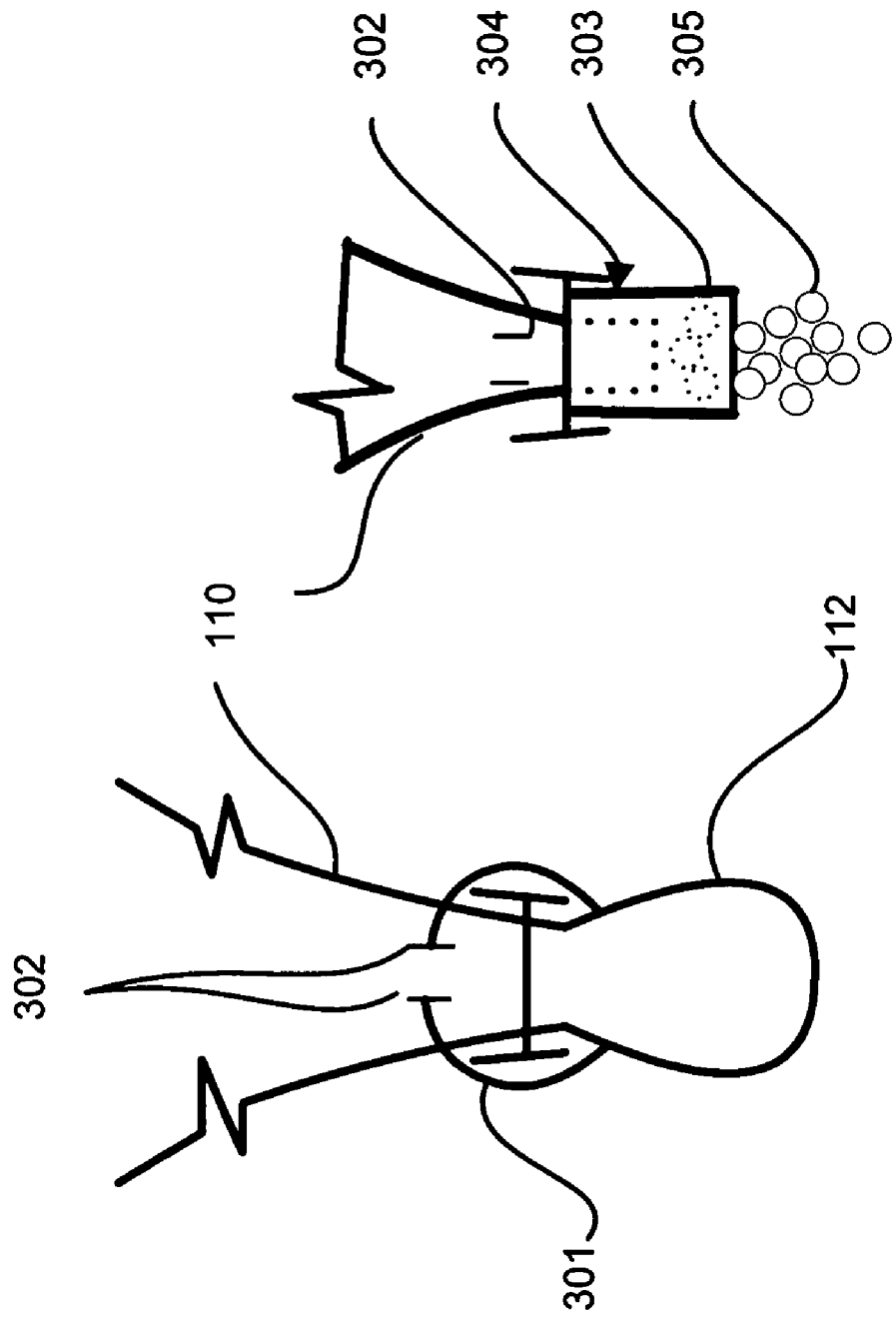
FIG. 5 illustrates a string clamp device for closing the sandbags according to one embodiment of the present invention.

FIG. 5 illustrates two work stations, each having a string clamp device 302 for closing the sandbags 112 according to one embodiment of the present invention. In one embodiment, the string clamp device 302 is configured to hold sandbag draw strings 301. As the sandbag 112 is removed, the clamps 302 hold the draw strings 301 and draw the sandbag 112 closed. Other types of closure devices may be used such as zip ties.

The string clamp device 302 may be grooves (not shown) cut into the flume 110 or clamps that form a friction fit with the draw strings. In operation, when the user places a sandbag 112 over a flume exit 303, the user also attaches the draw strings 301 to the string clamp device 302 and secures the sandbag 112 to a quick release sleeve clamp 304. The sandbag 112 may be secured with clamps that "grab" the bag, friction fit between the flume exit 303 and the sleeve clamp 304, or any other known method or device for securing the sandbag 112 to the flume exit 303. When the sandbag 112 is full, it falls, or is removed from the flume 110. With the draw strings still attached, the sandbag 112 automatically seals as the draw strings 301 tighten. The sandbag 112 is pushed onto the second conveyor system 114.

Referring still to FIG. 5, the quick release sleeve clamp 304 supports the weight of a full sandbag 112. When the sandbag 112 is filled, the user removes the quick release sleeve clamp 304 to release and drop the sandbag 112. The sleeve clamp 304 may also be configured to secure the draw strings 301 after the sandbag 112 has dropped.

FIGS. 6 and 7 illustrate a top and side view of portable conveyors 502 according to one embodiment of the present invention. The portable conveyors 502 are configured to move sandbags 112 away from the filling area 120. This allows a more efficient method of sandbag 112 filling and moving. In one embodiment, the portable conveyors 502 are configured with a width at least equal to that of the second conveyor system 114. However, one skilled in the art would recognize that any width greater than, or less than, the second conveyor system 114 would work sufficiently for the presently illustrated embodiment.

Each portable conveyor 502 connects to a similar portable conveyor 502. The legs 512 of the portable conveyors 502 are configured to be adjustable to allow the users to create a series of horizontally level portable conveyors 502. To facilitate transportation of the portable conveyors 502, the legs 512 are configured to fold for easy storage and transportation due to a quick release hinge 506. A quick release hinge 506 is illustrated to accomplish retraction of the legs 512, although any other known means be used.

In one embodiment, the portable conveyors 502 comprise a plurality of conveyor tracks. The portable conveyors 502 may be vertically angled to provide a slanted surface so that gravity assists in pulling each sandbag 112 to the end of the series of portable conveyors 502. Additionally, in another embodiment, the portable conveyors 502 may utilize motors or a hydraulic powered conveyor belt to move sandbags thereover. The portable conveyors 502 are configured to draw driving power via hydraulic power lines or other suitable sources.

Each portable conveyor 502 may comprise quick connects 504. The quick connects 504 are configured to attach each of the portable conveyor 502 to another section 502. Additionally, the quick connects 504 may be configured to transport hydraulic fluid from one portable conveyor 502 to another portable conveyor 502.

In order to efficiently move sandbags, the portable conveyors 502 may comprise a plurality of side portions, or walls 507 configured to maintain sandbags 112 on the conveyor belt 508 and prevent them from falling off the sides thereof. By using an automated moving system, it is possible to quickly fill sandbags 112 while keeping the working area around the filling area 120 uncluttered.

Figure 8:
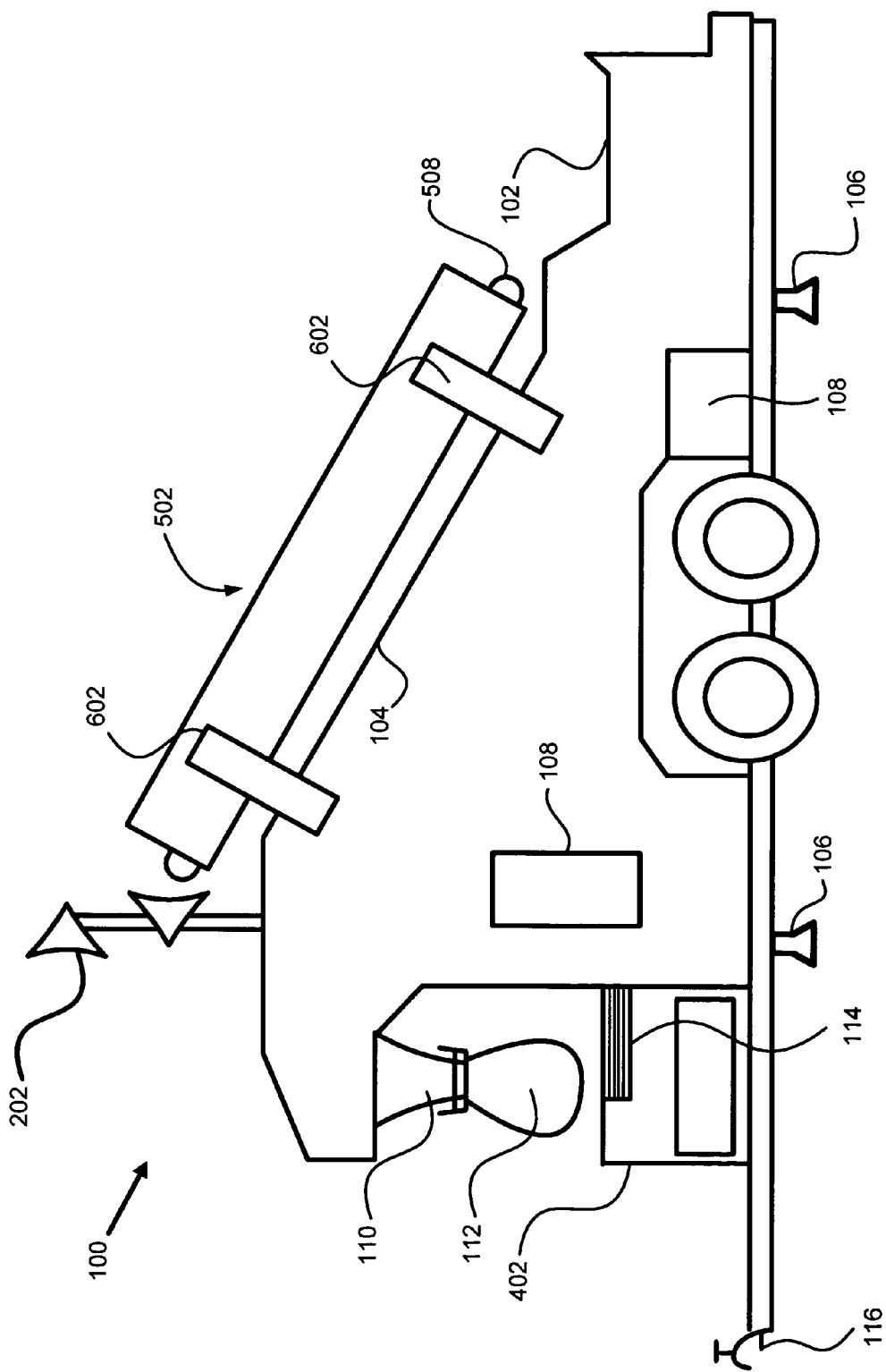
FIG. 8 illustrates a side view of a mobile bag filling system with a portable conveyor attached according to one embodiment of the present invention.
Figure 9:
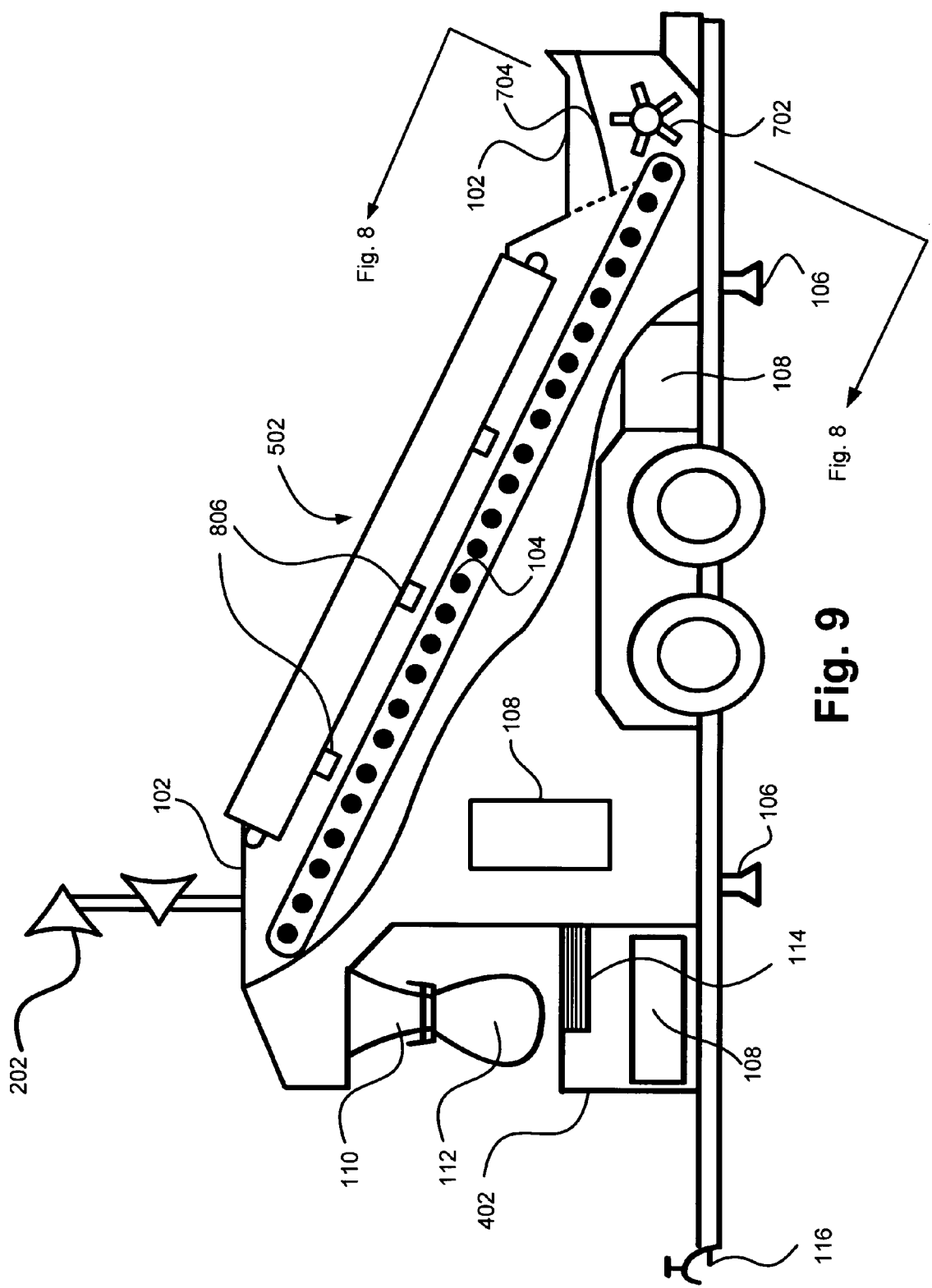
FIG. 9 illustrates a side partial cross-sectional view of a mobile bag filling system according to one embodiment of the present invention.
Figure 10:
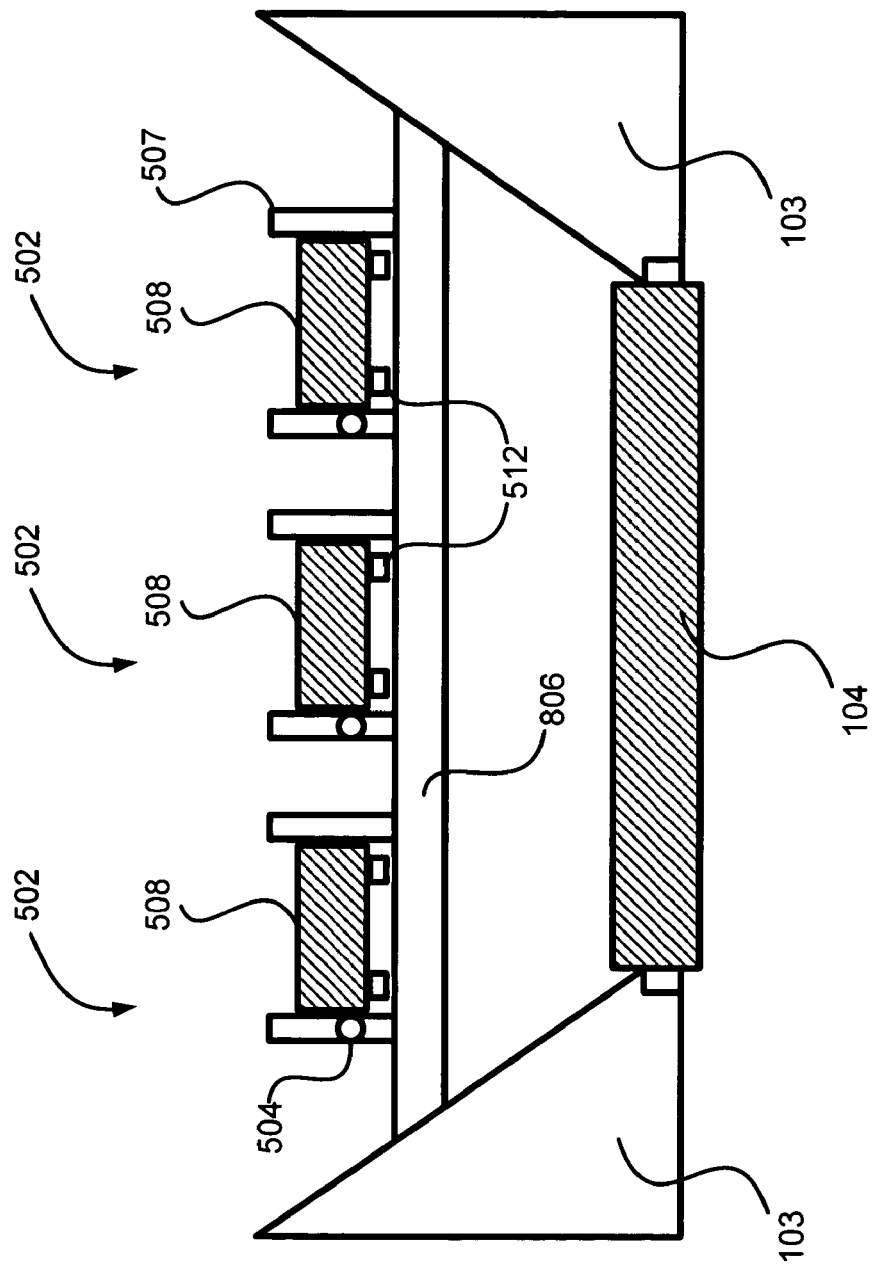
FIG. 10 illustrates a rear view of a portable conveyor attached to a mobile bag filling system according to one embodiment of the present invention.

FIGS. 8, 9 and 10 illustrate side and rear views of a mobile bag filling system with the portable conveyor 502 collapsibly attached according to one embodiment of the present invention. The portable conveyors 502 may be stored over the mobile bag filling system 100 by attaching optional brackets 602. The brackets 602 are configured to support the weight of the portable conveyors 502. Any number of portable conveyors 502 are mountable above the mobile bag filling system 100, in a side-by-side storage configuration, depending on the width of the portable conveyors 502. Preferably, the portable conveyors 502 are no longer than the length of the first conveyor system 104 so that they may completely fit snugly within the ramping section 122. In another embodiment, to completely fit within the ramping section 122, a lower mounting bracket 806 is attached to the inner walls 103 (See FIG. 3). The mounting bracket 806 may be configured to be removable. A protective cover (not shown) may also be attached thereover.

It is understood that the above-described arrangements are only illustrative of the application of the principles of the presently illustrated invention. The present invention may, however, be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the illustrative embodiment(s) have/has described the use of a trailer for transporting the mobile bagging system 100, it is envisioned that the mobile bagging system 100 may be incorporated into a fully operational vehicle.

It is also envisioned that the mobile bagging system may also be incorporated with other components such as an automatic sandbag attachment means that automatically attaches the empty sandbag 112 to the flumes 110.

Thus, while the present invention has been fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed:

1. A mobile bag filling system for filling bags with fluent matter, comprising:
   a hopper configured to receive the fluent matter from a source;
   an auger coupled to the hopper, the auger configured to move the fluent matter;
   a flume opposite the hopper, the flume configured to direct the fluent matter into a holding receptacle;
   a first conveyor system having a first end that is positioned to receive the fluent matter from the auger, and configured to move the fluent matter from the hopper to the flume;
   a holding receptacle docking station, configured to receive the holding receptacle after the holding receptacle has received the fluent matter and disconnected from the flume; and
   a second conveyor system positioned opposite the hopper, and configured to receive the holding receptacle after it has received the fluent matter and move the holding receptacle sufficiently to one side of the flume to allow a user to fill another holding receptacle, wherein the holding receptacle docking station and the second conveyor system are positioned such that when the holding receptacle is pushed toward the second conveyor system, the holding receptacle falls onto the second conveyor system.

2. The mobile bag filling system according to claim 1, wherein the second conveyor comprises a conveyor belt.

3. The mobile bag filling system according to claim 1, wherein the first conveyor system comprises a multiplicity of holes configured to allow water to escape the first conveyor system.

4. The mobile bag filling system according to claim 1, further comprising a portable conveyor configured to transport the holding receptacle from the second conveyor system away from the mobile bag filling system.

5. The mobile bag filling system according to claim 4, further comprising a storage means for storing the portable conveyor on the mobile bag filling system.

6. The mobile bag filling system according to claim 1, further comprising a plurality of telescoping, rotating light systems coupled to the conveyor system.

7. The mobile bag filling system according to claim 1, further comprising a plurality of storage areas.

8. The mobile bag filling system according to claim 1, further comprising a self leveling stabilizer support jack extending from the mobile bag filling system and configured to stabilize and level the mobile bag filling system.

9. The mobile bag filling system according to claim 1, wherein the flume further comprises string clamps configured to hold draw strings on the sandbags such that when the sandbag drops, the string clamps draw the sandbag closed to seal the fluent matter within.

10. The mobile bag filling system according to claim 9, wherein the string clamps comprise at least one flange protruding from the flume and the drawstrings friction fit into the flange.

11. A mobile bag filling system for filling bags with fluent matter, comprising:
    a hopper configured to receive the fluent matter from a source, and positioned at a first end of the mobile bag filling system;
    a directing member positioned at a second end of the mobile bag filling system, and configured to direct the fluent matter into at least one holding receptacle;
    a first conveyor system, configured to move the fluent matter from the hopper to the directing member; and
    a second conveyor system positioned proximate the second end and under the directing member, wherein the second conveyor system is configured to catch and support the holding receptacle upon release from the directing member.

12. The mobile bag filling system according to claim 11, wherein the second conveyor includes a conveyor belt.

13. The mobile bag filling system according to claim 11, wherein the first conveyor system comprises a multiplicity of holes configured to permit water to escape from the first conveyor system.

14. The mobile bag filling system according to claim 11, further comprising a portable conveyor configured to transport the holding receptacle from the second conveyor system away from the mobile bag filling system.

15. The mobile bag filling system according to claim 14, further comprising a storage means for storing the portable conveyor on the mobile bag filling system.

16. The mobile bag filling system according to claim 11, further comprising a plurality of telescoping, rotating light systems coupled to the conveyor system.

17. The mobile bag filling system according to claim 11, further comprising a plurality of storage areas.

18. The mobile bag filling system according to claim 11, further comprising a stabilizer support jack extending from the mobile bag filling system and configured to stabilize the mobile bag filling system.

19. The mobile bag filling system according to claim 11, wherein the flume further comprises string clamps configured to hold draw strings on the sandbags such that when the sandbag drops, the string clamps draw the sandbag closed to seal the fluent matter within.

20. The mobile bag filling system according to claim 19, wherein the string clamps comprise at least one flange protruding from the flume and the drawstrings friction fit into the flange.

* * * * *